United States Patent [19]

Uhlemann et al.

[11] Patent Number: 5,213,820
[45] Date of Patent: * May 25, 1993

[54] PROCESS AND DEVICE FOR FLUIDIZED BED SPRAY GRANULATION

[75] Inventors: Hans Uhlemann, Solingen; Reinhard Boeck, Kaarst; Hans Daun, Leverkusen; Heiko Herold, Neuss, all of Fed. Rep. of Germany

[73] Assignee: Bayer Aktiengesellschaft, Leverkusen, Fed. Rep. of Germany

[*] Notice: The portion of the term of this patent subsequent to Jun. 5, 2007 has been disclaimed.

[21] Appl. No.: 714,357

[22] Filed: Jun. 12, 1991

Related U.S. Application Data

[60] Division of Ser. No. 560,244, Jul. 26, 1990, abandoned, which is a continuation of Ser. No. 316,362, Feb. 27, 1984, abandoned.

[30] Foreign Application Priority Data

Mar. 12, 1988 [DE] Fed. Rep. of Germany ....... 3808277

[51] Int. Cl.$^5$ .................... B22F 3/00; C05B 19/00; C22B 1/14
[52] U.S. Cl. .................. 425/222; 23/313 FB; 209/147; 241/19
[58] Field of Search ............. 23/313 FB, 313 R; 425/222; 7/64.06; 241/24, 19; 209/144, 147

[56] References Cited

U.S. PATENT DOCUMENTS

| | | | |
|---|---|---|---|
| 1,401,304 | 7/1925 | Kaspar et al. | 23/313 FB |
| 2,586,818 | 2/1952 | Harms | 23/313 FB |
| 3,795,504 | 3/1974 | Wengeler | 71/64.06 |
| 3,929,628 | 12/1975 | Denevi et al. | 209/147 |
| 4,098,464 | 7/1978 | Niedner et al. | 241/24 |
| 4,832,700 | 5/1989 | Kasper et al. | 23/313 FB |
| 4,931,174 | 6/1990 | Uhlemann et al. | 209/154 |
| 4,946,653 | 8/1990 | Stopp et al. | 23/313 FB |
| 4,946,654 | 8/1990 | Uhlemann et al. | 427/213 |

FOREIGN PATENT DOCUMENTS

| | | | |
|---|---|---|---|
| 76473 | 11/1970 | Fed. Rep. of Germany | 425/222 |
| 322210 | 9/1969 | U.S.S.R. | 425/222 |
| 1401304 | 7/1975 | United Kingdom | 23/313 FB |

*Primary Examiner*—Gary P. Straub
*Attorney, Agent, or Firm*—Sprung Horn Kramer & Woods

[57] ABSTRACT

Granule production is based on particle growth in a fluidized bed (4), in which the liquid starting product is sprayed into the fluidized bed and the finished granular particle is discharged from the fluidized bed (4) with classification. The classification is carried out with the aid of a classifying air flow which is divided into individual single flows (6) to each of which is assigned a zigzag classifier module (7, 17) and a spray nozzle (5) or a group of spray nozzles. The course of the classifying process is such that the granular particles which are too small and have not yet reached the desired diameter are thrown back into the fluidized bed (4) by a return shaft (9, 18) seated on each of the zigzag classifier modules (7, 17) in parallel or radial zones without cross-mixing, in which the relatively small particles impinge at a relatively large distance from the return shaft (9, 18) and the large particles, which have already grown close to the discharge size, impinge at a relatively small distance. The process is carried out with the aid of a fluidized bed granulator, to the inlet plate (2) of which is connected a zigzag classifier, subdivided in a modular manner, in which each zigzag classifier module (7, 17) is provided with a return shaft (9, 18) at the point where it joins the inlet plate (2, 16). In addition, at least one spray nozzle (5) at the inlet plate (2, 16) is allocated to each zigzag classifier module (7, 17).

2 Claims, 4 Drawing Sheets

PROCESS AND DEVICE FOR FLUIDIZED BED SPRAY GRANULATION

This application is a divisional, of application Ser. No. 07/560,244, filed Jul. 26, 1990 and now abandoned and which is a continuation of application Ser. No. 07/316,362, filed on Feb. 27, 1989, and now abandoned.

BACKGROUND OF THE INVENTION

The invention starts from a process for producing granules with a narrow particle size distribution in which the liquid starting product is sprayed into a fluidized bed and the finished granular particles are discharged from the fluidized bed with classification on the zigzag classifying principle. The invention also relates to a device for carrying out the process.

In modern processes for fluidized bed spray granulation the granules are produced in one process stage from the liquid starting product, there being a classifying discharge from the fluidized bed. It is therefore possible to dispense with external classifying and grinding of the oversize particles. This process requires a classifying discharge which releases the particles which have achieved the required particle size from the fluidized bed. A process of this type is, for example, described in EP 163,836.

A granulator of circular cross-section is known from DE 2,555,917 in which the classifying discharge device is positioned in the centre of the fluidizing base (inlet plate). The inlet plate is formed from a perforated plate which has increasing density of perforation from the inside to the outside. This has the effect that the particles rise at the container wall and fall in the centre.

In another fluidized bed granulator described in DE 1,667,217 a so-called spouted bed is produced for active blending of the bed contents. This produces a forced particle circulation which is exactly the opposite of the one described above. The circular conical constriction of the granulator at the base is a determining factor for this particle circulation. At the lower end of the conical constriction is attached a tube through which the fluidizing air passes into the granulator. A jet channel is produced at the axis of the fluidized bed in which the particles are dragged upwards. Above the bed the particles fall out of the jet and back into the bed. There is thus a particle circulation in which the conical base promotes the transfer of the particles into the jet channel. The particles which have achieved the required particle size fall down within the air supply tube and are transferred out of the granulator. This type of granulator has proved to be effective for relatively small cross-sections; however, problems and difficulties appear with the large throughputs which can only be achieved with correspondingly large cross-sections.

The particle circulation described previously in which the particles fall at the granulator axis is preferably combined with injection of the liquid product from above, while a particle circulation which rises at the granulator axis is required for injection from below.

It is known that in general there are difficulties in scaling-up for gas/solid/oil beds (see, for example, Aufbereitungstechnik No. 12 (1974) pages 670 to 677). The similitude theory which is often employed at other times for process engineering plants fails in this case. It has been found that in fairly large fluidized bed granulators with classifying discharge the particles travel through the fluidized bed on longer paths and therefore no longer participate so frequently in the classifying process. This increases the risk of forming oversized particles. In unfavourable situations coarse particles can also fall into the fluidized bed here and concentrate in the vicinity of the inlet plate. In extreme cases the fluidization can "go to sleep" here. The coarse particles then settle on the inlet plate and increase still further in size through the addition of other particles. The resulting large aggregates (lumps) come into contact with the hot fluidizing air and suffer thermal deterioration. They also disrupt the flow through the bed. Under some circumstances this disruption can even spread to total collapse of the fluidized bed. The size of the particle contained in the bed must therefore be checked at short intervals if trouble-free operation is to be maintained.

This is where the invention come into effect.

SUMMARY OF THE INVENTION

The object is to develop a process for fluidized bed spray granulation with classifying discharge in which, regardless of the size of the equipment, the relatively coarse granules which have already grown close to the desired particle size participate, not with decreasing but rather with increasing frequency, in the classifying process in order to exclude the above mentioned operating problems and also to avoid scale-up problems.

Starting from a fluidized bed granulation process in which the finished granular particles are discharged from the fluidized bed with classification on the zigzag classifying principle, this problem is solved in accordance with the invention in that the granulation chamber is divided into uniform zones to each of which is assigned a zigzag classifier module and a spray nozzle or a group of spray nozzles and the granular particles are thrown back into the fluidized bed by a return shaft seated on each of the zigzag classifier modules in parallel or radial paths without cross-mixing, in which the relatively small particles impinge at a relatively large distance from the return shaft and the large particles, which have already grown close to the discharge size, impinge at a relatively small distance. The modular subdivision of the granulation chamber makes possible a defined particle circulation in which the fine particles are intentionally thrown back further out in the bed while the coarser particles fall back into the fluidized bed in the vicinity of the return shaft and are therefore classified more frequently. The controlled ejection of the particles from the return shaft also avoids cross-mixing between the individual zones of the granulation chamber.

The fluidized bed granulator used for carrying out the process is modified in accordance with the invention such that the zigzag classifier used for the classifying discharge is subdivided in a modular manner and that at least one spray nozzle at the inlet plate is allocated to each zigzag classifier module and that a return shaft is seated on each zigzag classifier module at the point where it joins the inlet plate.

Each zigzag classifier module is also advantageously provided with an underflow weir at the point where it joins the inlet plate so that the particles are dammed up at the point of entry to the zigzag classifier.

In accordance with a preferred embodiment the fluidized bed granulator and the zigzag classifier modules have rectangular cross-sections. In this case the width B of the fluidized bed granulator is equal to the length L of a zigzag classifier duct and the length L of the fluidized bed granulator is equal to an integer multiple of the width b of the zigzag classifier duct.

An alternative embodiment is characterized in that only one spray nozzle is allocated to the zigzag classifier module, the classifier duct having an annular shape, and in that the return shaft seated on it encloses the spray nozzle concentrically.

To clean the exhaust air it is advisable to position filter elements for exhaust air cleaning above the spray nozzles allocated to a zigzag classifier module.

The following advantages are achieved with the invention.

Due to the modular, zonally-divided, classifying system and particle return to the fluidized bed and the resulting defined trajectories with shorter distances for the coarse particles and larger distances for the undersized particles it is possible to avoid the formation of oversized particles and the resulting operating problems of the fluidized bed described above. A further substantial advantage lies in the fact that due to the modular mode of construction it is possible to build granulators of very large dimensions if correspondingly high throughputs are required. The difficulties that have occurred previously with scale-up of fluidized bed granulators are thereby removed. The defined particle circulation at the fluidized bed also leads to further improvement of the sharpness of classification during the discharge; i.e. it permits even narrower particle size distributions to be achieved.

Exemplary embodiments of the invention are described below with the aid of the drawings, in which:

DETAILED DESCRIPTION OF THE INVENTION

Figure 1:
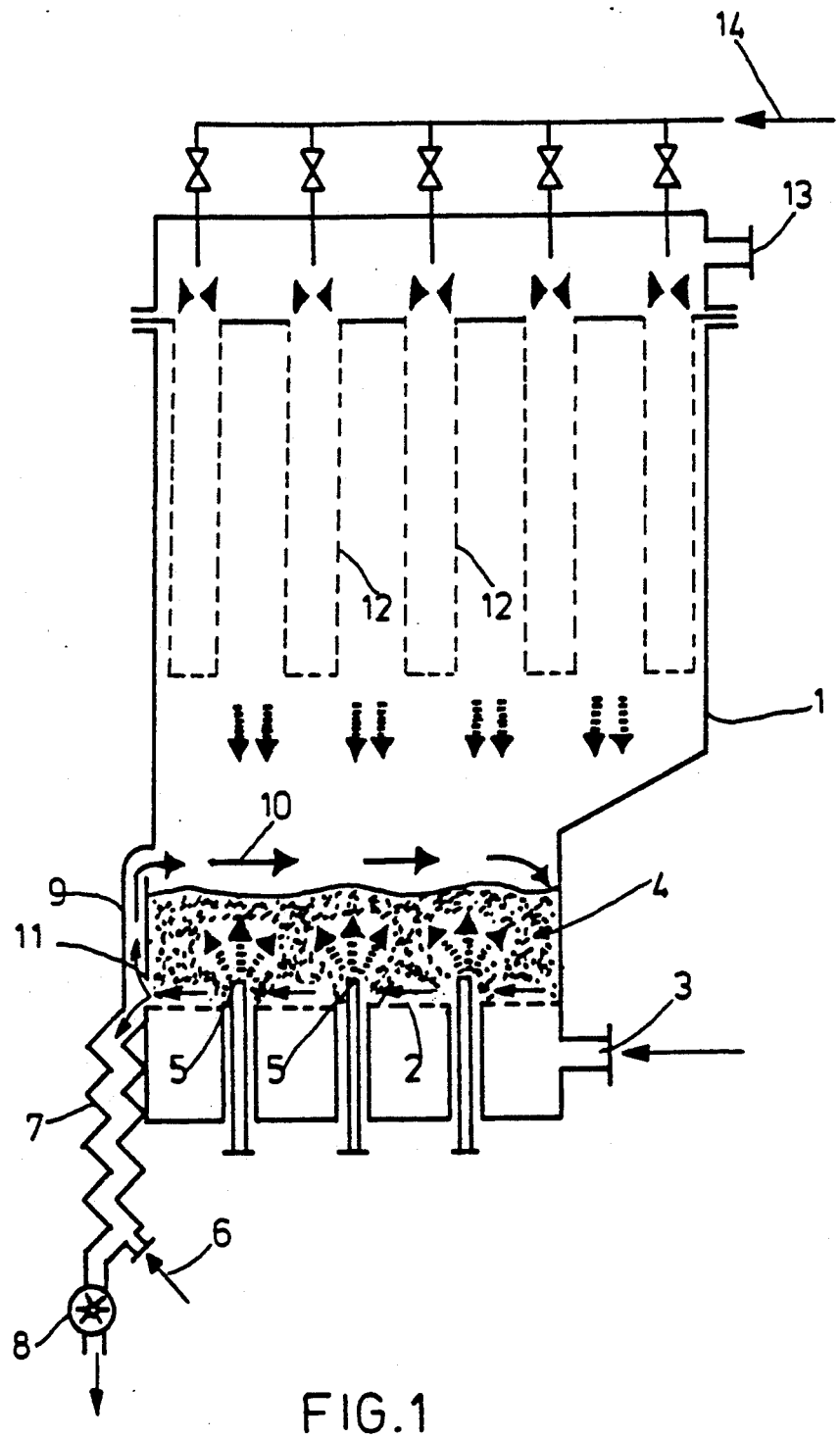
FIG. 1 shows a section through a fluidized bed granulator with a zigzag classifier module and the associated spray nozzles.

The fluidized bed granulator represented schematically in FIG. 1 consists of a casing 1 with an inlet plate 2 above which is maintained a fluidized bed 4 by means of a fluidizing gas 3. The liquid starting material from which the granules are to be produced is sprayed from below into the fluidized bed through the binary nozzles 5. The diameter of the particles in the fluidized bed increases constantly in the form of shells, due to the material which is sprayed on and solidifies, until it can pass the classifying air flow 6 in the zigzag classifier module 7 and be discharged through the cellular wheel sluice 8. On the other hand, the smaller particles still lying below the desired particle size are carried upwards by the classifying air flow through the return shaft 9 and are thrown back horizontally (arrow 10) into the fluidized bed 4. During this process the somewhat coarser and heavier particles drop down in the vicinity of the return shaft 9, while the finer particles are thrown further out. The result of this is that the relatively coarse particles which have already grown close to the desired particle size passes the underflow weir 11 and participates in the classifying process at short time intervals while the fine particles deposited further out must travel back over the entire depth of the module. During their passage through the fluidized bed their growth is encouraged by adsorption and wetting near the binary nozzles 5. The modular subdivision into granulator zones or segments thus leads to defined growth and discharge conditions. These can be optimized without difficulty in a single segment and then also apply to the entire production equipment.

Filter sleeves 12 for cleaning the exhaust air 13 drawn from the granulator are fixed above the fluidized bed 4 in each segment. Scavenging gas 14 can be admitted to the filter sleeves 12 which are freed from the adhering fine dust. During the cleaning process the filter dust pours off like an avalanche into the fluidized bed 4 where it is incorporated into the granulation process again.

Figure 2:
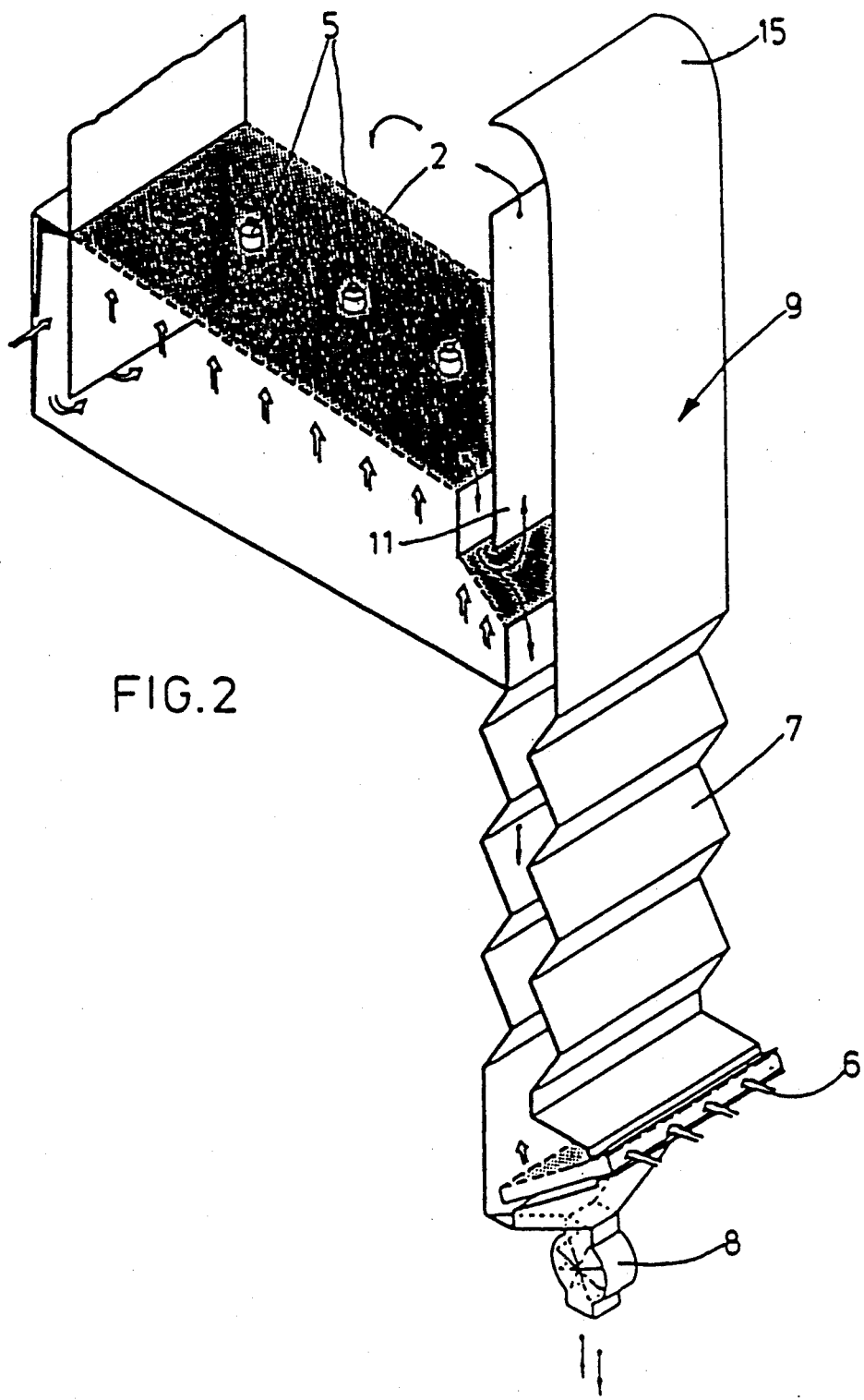
FIG. 2 shows a zigzag classifier module with spray nozzles and inlet plates in a perspective representation, in which the classifier cross-section is shown turned through 90° for greater clarity.

The construction of a zigzag classifier module with the accompanying spray nozzle group 5 and the associated inlet plate zone 2 can be seen in detail from FIG. 2. The return shaft 9 which is fitted with a curved baffle plate 15 and is seated on the zigzag classifier module 7 ensures that the undersized material is blown back into the fluidized bed almost horizontally and within a restricted layer on the inlet plate zone. There is thus no cross-mixing; i.e. the articles fly into adjacent zones only to a small extent. The module shown in FIG. 2 can therefore be regarded as a selfcontained unit from the process engineering point of view.

Figure 3:
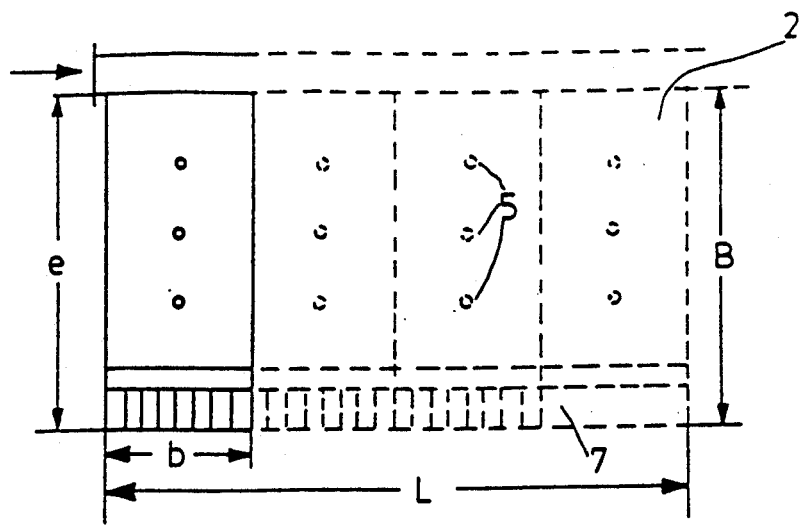
FIG. 3 shows a plan view of the modular structure of the granulator.

Such units are combined to form a large fluidized bed granulation plant with a rectangular cross-section as shown in FIG. 3. With appropriate dimensioning the granulator cross-section defined by the desired throughput can be completely covered without difficulty. To this end the module shown in FIG. 2 is dimensioned so that width B of the fluidized bed granulator is equal to the length 1 of the fluidized bed zone plus the width of a zigzag classifier duct and the length L of the fluidized bed granulator is equal to an integer multiple of the width b of the zigzag classifier duct.

Figure 4:
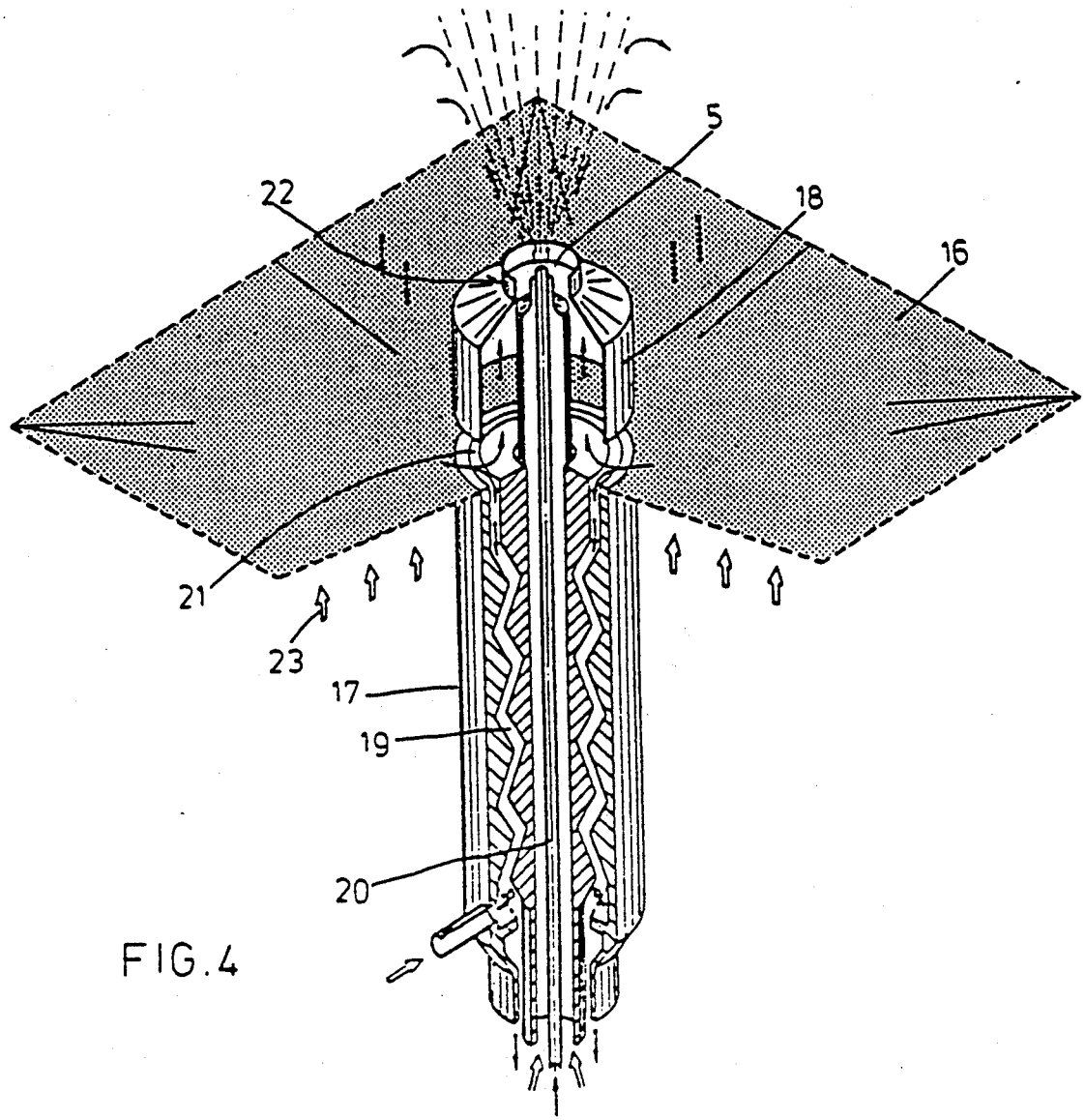
FIG. 4 shows a single-nozzle module with spray nozzle and concentric zigzag classifier.
Figure 5A:
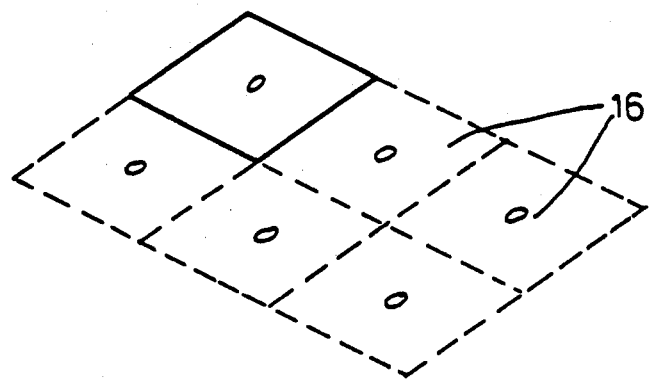
FIG. 5a shows the arrangement of single-nozzle modules to form a fluidized bed granulator of rectangular cross-section.
Figure 5B:
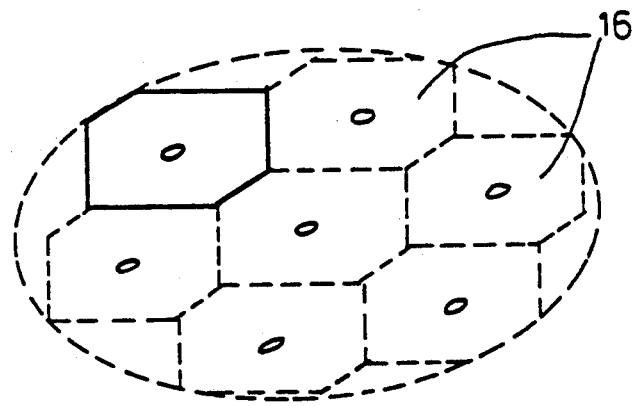
FIG. 5b shows the arrangement of the single-nozzle modules when a circular cross-section is formed.

An alternative embodiment of the invention can be formed with the single-nozzle module as shown in FIGS. 4 to 5. The module is formed here of a single spray nozzle 5 which is positioned in the centre of a rectangular or hexagonal inlet plate element 16 and by an annular zigzag classifier 17 and a return shaft 18 which encloses concentrically the spray nozzle 5 and is seated at the point of connection of the inlet plate 16. In this case the annular zigzag classifier duct 19 also encloses the inlet lines 20 for the binary spray nozzle (gas and liquid starting material). In a similar manner to the embodiment shown in FIGS. 1 and 2 the granules to be classified are drawn into through an annular gap 21 (underflow weir) between the return shaft 18 and the classifier module 17. The suction generated by the binary jet 5 is assisted by the collar-shaped cross-section restriction 22 at the outlet of the return shaft 18. In this way the undersized material drawn in is conveyed directly into the spray jet where it is wetted with the granulation liquid. This in turn provides controlled improvement of the growth conditions for the undersized material. The wetted particles then fall from the spray jet against the fluidizing air flow 23 while the liquid shell which has been applied solidifies on the particle and thus a larger particle is produced. Finally, after crossing the inlet plate 16, the particles are again fed to the annular zigzag classifier module 17. The trajectories of the particles are controlled by the same physical criteria as in the embodiment shown in FIGS. 1 and 2; i.e. the relatively large, heavier particles impinge on the fluidized bed in a relatively narrow circumference from the zigzag classifier module 17, while the smaller particles are thrown further out. The same conditions apply to each radial zone; the configuration is rotationally symmetrical with respect to design and mode of operation.

This permits granulator modules to be joined together to form a larger cross-sectional area. Thus FIG. 5a indicates how single-nozzle modules as shown in FIG. 4 with rectangular or square inlet plate elements 16 are best used to cover a rectangular fluidized bed granulator cross-section, while it is advisable to base a circular fluidized bed granulator on an inlet plate element with a hexagonal base surface (see FIG. 5b). Circular granulators are always an advantage when the equipment must be designed to be resistant to pressure.

In analogy to the embodiment shown as in FIGS. 1 and 2 filter elements for cleaning exhaust air can in each case be incorporated above a zigzag classifier module as shown in FIG. 4.

What is claimed is:

1. In an apparatus for producing granules, having a fluidized bed of fluidizing gas and particles, means for spraying liquid starting material into the fluidized bed, means for discharging particles of at least a given size from below the bed and means for classifying the discharged particles and returning a relatively finer fraction of particles into the fluidized bed, the improvement wherein:
   a) the fluidized bed has a rectangular cross-section and includes a plurality of parallel zones along the length thereof such that the sum of the widths of the plurality of zones equals the length of the fluidized bed;
   b) the means for discharging comprises a full width underflow weir feeding a plurality of zig-zag classifiers, each classifier having downwardly extending zig-zag flow paths receptive of the discharged particles, the zig-zag classifiers each have a rectangular cross-section and are adjointly arranged side by side along the length of the fluidized bed and wherein the length of each zig-zag classifier is equal to the width of each zone;
   c) the means for classifying and returning comprises means for directing parallel countercurrent classifying air flows in the zig-zag flow paths, a plurality of separated return shafts downstream of the zigzag classifiers for conveying the classifying air flows together with the relatively finer fraction of particles and each having means for directing the classifying air flows and particles into a corresponding single one of the plurality of separate parallel zones of the fluidized bed without cross mixing between the zones, such that for each zone the relatively small particles impinge at a relatively large distance from the return shafts and for each zone relatively large particles impinge at a relatively small distance from the return shafts, thereby passing said relatively large particles in each zone into the zig-zag classifiers more frequently than the relatively small particles; and
   d) wherein the means for spraying comprises means for spraying starting liquid separately into each of said zones of the fluidized bed comprising at least one spraying nozzle for each zone.

2. The apparatus according to claim 1, wherein the means for discharging particles further comprises means forming a single vertical path above the underflow weir for each zone for the parallel passage of the particles in the parallel air flows generally horizontally over the fluidized bed into the separate parallel zones.

* * * * *

UNITED STATES PATENT AND TRADEMARK OFFICE
CERTIFICATE OF CORRECTION

PATENT NO. : 5,213,820

DATED : May 25, 1993

INVENTOR(S) : Uhlemann, et al.

It is certified that error appears in the above-identified patent and that said Letters Patent is hereby corrected as shown below:

Col. 6, line 37    After " of " insert -- particles blown by the parallel air flows and a downstream deflector for directing --

Signed and Sealed this

Twenty-third Day of August, 1994

Attest:

BRUCE LEHMAN

*Attesting Officer*     *Commissioner of Patents and Trademarks*